(12) United States Patent
Hosoe

(10) Patent No.: US 6,832,495 B2
(45) Date of Patent: Dec. 21, 2004

(54) MOLDING DIE

(75) Inventor: Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 394 days.

(21) Appl. No.: 09/867,526

(22) Filed: May 31, 2001

(65) Prior Publication Data

US 2001/0053395 A1 Dec. 20, 2001

(30) Foreign Application Priority Data

Jun. 1, 2000 (JP) ........................................ 2000-164463

(51) Int. Cl.[7] ............................. C03B 9/40; A01J 21/00
(52) U.S. Cl. ........................ 65/323; 65/305; 425/405.1; 425/406; 425/408
(58) Field of Search ................................ 425/406, 808, 425/405.1, 408; 65/323, 305, 39, 47, 374.13; 359/819

(56) References Cited

U.S. PATENT DOCUMENTS 6,003,339 A * 12/1999 Morikita ...................... 65/275

FOREIGN PATENT DOCUMENTS

| JP | 402175115 A | * 7/1990 | ................. 264/500 |
| JP | 4-317427 | * 11/1992 | |
| JP | 6-271323 | * 9/1994 | |
| JP | 7-172845 | * 7/1995 | |

* cited by examiner

Primary Examiner—Dionne A. Walls
(74) Attorney, Agent, or Firm—Finnegan, Henderson, Farabow, Garrett & Dunner, L.L.P.

(57) ABSTRACT

A molding die includes a pair of molding die members for forming a molding cavity that molds molded products and a holding member that holds therein the molding die members slidably, wherein a pressure-transfer medium supplied to the clearance between the molding die members and the holding member makes the molding die members to be slid and held in the holding member while the molding die members and the holding member are on the non-contact state.

45 Claims, 9 Drawing Sheets

PRIOR ART

PRIOR ART

MOLDING DIE

BACKGROUND OF THE INVENTION

The present invention relates to a molding die having the die structure capable of producing molded parts such as highly accurate optical parts in a stable manner, a molding device equipped with the molding die, a molding method employing the molding die or the molding device, an injection molding machine, an injection compression molding machine, a compression molding machine and a glass molding machine.

Up to now, the die structure composed of a pair of dies 1a and 1b, molding cavity 1c formed between the paired dies, and barrel die 2 holding the paired dies to be in contact therewith as shown in FIG. 8 has been popular, in a molding die that molds a highly accurate form such as an optical surface.

In the case of a die structure having a plurality of molding cavities for a multi-cavity mold, the die structure has had construction wherein barrel dies are united solidly to be a thick plate called a mold plate, and holes each fitting or sliding on a die in quantity equivalent to the number of cavities are formed on the thick plate and a die is embedded in each hole. For example, an injection molding metallic mold for plastic optical elements is composed of fixed side mold plate 5 that is fixed on a molding device and movable side mold plate 4 that is fixed on movable platen 7 and is moved for open and close, as shown in FIG. 9, and plural dies 5a and plural dies 4a are embedded and held to form plural cavities respectively in the fixed side mold plate and the movable side mold plate. In the construction, when the movable side mold plate 4 is closed, parting surface 6 of the mold plate 4 and parting surface 6 of the mold plate 5 are brought into close contact with each other so that dies 5a and dies 4a face each other to form molding cavities to which resins are injected. The foregoing also applies to a metallic mold for injection compression molding wherein after the fixed side mold plate and the movable side mold plate are closed each other and optical materials such as resins are injected in a cavity, a die on one side moves in the direction of an optical axis of an optical surface to reduce a cavity volume and thereby to apply pressure of 10 kN/cm or more on resins in the cavity to enhance transferability of a molded form.

In particular, in the case of a molding die for a lens, it is important, for forming a highly accurate lens, that each die has a pair of highly accurate optical surface forms, and the optical surface form on one side does not have eccentricity such as tilting or shifting for the optical surface on the other side when the die is closed and coaxiality can be kept accurately.

Until now, in the case of a multi-cavity mold, it has been a common method that holes are formed on a mold plate and dies are fitted in the holes, when fixing a die on a mold as stated above, and therefore, when enhancing coaxiality for a pair of dies, it has been common to make fitting tolerance small, by making tolerance for hole position accuracy and a hole diameter on a mold plate and for perpendicularity for the parting plane and tolerance for an outside diameter dimension of a die and for cylindricity to be small. However, molded products have been required to be highly accurate, and thereby an eccentricity tolerance has been narrowed to be more strict, and narrowing of the tolerance of fitting for dies and mold plates is approaching to its limit in the conventional technology for parts processing. For example, in the case of an injection molding metallic mold, a plurality of dies are arranged in a form of concentric circles around an injection outlet (a sprue) for resins at the central portion on the mold plate because molded products are usually produced on a multi-cavity mold basis for enhancing molding efficiency. A diameter of this pitch circle is 100 mm or more even for a relatively small molded product, and when there is a temperature difference of 1° C. between a fixed die and a movable die in the course of molding operation, there is caused a deviation of 1 μm between diameters of pitch circles. Further, with regard to processing accuracy for making holes on a mold plate, about 3 μm for a hole diameter and about 5 μm for a hole position are the limit, even when the holes are processed accurately by using a jig grinding machine. Furthermore, with regard to accuracy for processing an outside diameter of a die to be fitted in a hole, about 3 μm is a limit again, and if these limit tolerances for parts processing are accumulated, coaxiality of about 8 μm of the die can be caused when dies are closed. Thus, it is generally difficult to make the coaxiality between optical surfaces of dies to be 8 μm or less, even at the cost of enormous labors and expenses. Further, even if the coaxiality between dies can be restrained to 8 μm or less, an increase of friction, galling and seizing are brought about and troubles in operations tend to be caused because of a small fitting clearance, when a die is slid in the direction of an optical axis of an optical surface for taking out of a molded optical element or for pressurization. Therefore, it is impossible, after all, to keep a thickness of a molded optical element to be highly accurate and constant with excellent reproducibility. From the foregoing, in the case of a pickup objective lens for an optical disk with high NA such as NA of 0.85, for example, allowable eccentricity of an optical surface and allowable dispersion of axial thickness are not more than about 1 μm, and therefore, in the case of the structure of a multi-cavity metallic mold that is dependent on conventional accuracy of parts processing, each of the eccentricity of the optical surface and the dispersion of the axial thickness results in several times that of the aforesaid allowable eccentricity and the allowable dispersion, even when the production is tried at the highest accuracy possible, which causes serious spherical aberration and coma on molding lens power to make it impossible to obtain sufficient optical efficiency.

In glass molding technology for molding a glass lens, there are a single-cavity mold type and a multi-cavity mold type, and in the case of the multi-cavity mold type, its structure is exactly the same as that of the injection molding metallic mold for plastic lenses, and the limit of accuracy for processing each part makes it difficult equally to lower the eccentricity tolerance to 8 μm or less. In the case of a single-cavity mold type, it employs a mold structure wherein three parts including a pair of dies each having an optical surface and a barrel die that holds the paired dies are bases. With regard to this, tapered portions 8a are provided on barrel die 8 as shown in FIG. 10, and these tapered portions 8a are fitted respectively with tapered portions provided on a pair of dies 9a and 9b so that a molding cavity is formed between the dies 9a and 9b. Coaxiality between both dies is determined by accuracy for processing parts such as coaxiality between both tapered portions on the barrel die 8 and coaxiality between optical surfaces of tapered portions respectively on the dies 9a and 9b. Coaxiality of about 1 μm for tapered portions is a conventional ordinary limit for processing, and if parts processing accuracy is accumulated, therefore, shifted eccentricity of optical surfaces of about 3 μm is a limit. Because of taper fitting between barrel die 8 and dies 9a and 9b, fitting surfaces tend to be worn away, which is different from non-tapered fitting, thus, the barrel die is made of hard-machining materials having high hardness such as ceramics.

From the foregoing, even in the case of glass molding, accuracy of eccentricity of molded optical elements is also dependent greatly on processing accuracy for parts of a mold and is limited, and how the eccentricity is dispersed is less reproducible and its control is difficult, which makes ensuring of molding power and stable manufacturing both for advanced and highly accurate optical elements such as high NA lens difficult.

SUMMARY OF THE INVENTION

In view of the problems in the conventional technologies stated above, an objective of the invention is to improve eccentricity accuracy and accuracy in the direction of an axis without using complicated mechanism, and to provide a molding die, a molding apparatus, a molding method, an injection molding machine, an injection compression molding machine, a compression molding machine, a glass molding machine and a molding method, all having the mold structure which makes it possible to manufacture highly accurate optical elements and molded parts stably.

The objectives stated above can be attained by either one of the following Structures 1–23.

Structure 1: A molding die comprising a pair of molding die members for forming a molding cavity that molds molded products and a holding member that holds therein the molding die members slidably, wherein a pressure-transfer medium supplied to the clearance between the molding die members and the holding member makes the molding die members able to be slid and held in the holding member while the molding die members and the holding member are in the non-contact state.

Structure 2: The molding die according to Structure 1, wherein the clearance between the molding die members and the holding member is within a range of 0.1–100 μm.

Structure 3: The molding die according to Structure 1, wherein the pressure-transfer medium is gas or a liquid.

Structure 4: The molding die according to Structure 1, wherein there is provided, on the molding die member, a supply port for the pressure-transfer medium that supplies pressure-transfer media to the clearance between the molding die members and the holding member.

Structure 5: The molding die according to Structure 1, wherein there is provided, on the holding member, a supply port for the pressure-transfer medium that supplies pressure-transfer media to the clearances between the molding die members and the holding member.

Structure 6: The molding die according to Structure 1, wherein there are provided a plurality of supply ports for pressure-transfer medium which supply pressure-transfer media to the clearance between the molding die members and the holding member.

Structure 7: The molding die according to Structure 6, wherein there are provided a plurality of supply ports for pressure-transfer medium which are arranged in the axial direction of the molding die, and there are provided a plurality of supply ports in a plane that is perpendicular to the axial direction.

Structure 8: The molding die according to Structure 1, wherein a supply port for the pressure-transfer medium that supplies pressure-transfer media to the clearance between the molding die members and the holding member and a supply path for the pressure-transfer medium connected to the supply port for the pressure-transfer medium are provided, and a fixed throttle for regulating a flow of the pressure-transfer medium is provided on the supply path for the pressure-transfer medium.

Structure 9: The molding die according to Structure 1, wherein a supply port for the pressure-transfer medium that supplies pressure-transfer media to the clearance between the molding die members and the holding member is provided, and the circumference of the supply port for the pressure-transfer medium is recessed.

Structure 10: The molding die according to Structure 1, wherein a supply port for the pressure-transfer medium that supplies pressure-transfer media to the clearance between the molding die members and the holding member and a supply path for the pressure-transfer medium connected to the supply port for the pressure-transfer medium are provided, and an automatic adjusting throttle is provided on the supply path for the pressure-transfer medium.

Structure 11: The molding die according to Structure 1, wherein the molding die member or the holding member has a porous member through which the pressure-transfer medium is supplied to the clearance.

Structure 12: The molding die according to Structure 1, wherein the molding die member or the holding member is made of ceramic materials.

Structure 13: The molding die according to Structure 1, wherein the molded products are optical elements.

Structure 14: A molding apparatus comprising a molding die that comprises a pair of molding die members which form a molding cavity for molding molded products, a holding member that holds therein the molding die member slidably, and a pressure-transfer medium supplying means for supplying the pressure-transfer medium to a clearance between the molding die member and the holding member, wherein a pressure-transfer medium supplied to the clearance makes the molding die members to be slid and held in the holding member while the molding die members and the holding member are on the non-contact state.

Structure 15: The molding apparatus according to Structure 14, wherein the clearance between the molding die members and the holding member is within a range of 0.1–100 μm.

Structure 16: The molding apparatus according to Structure 14, wherein the pressure-transfer medium is gas or a liquid.

Structure 17: The molding apparatus according to Structure 14, wherein the pressure-transfer medium is supplied to the clearance under the pressure of 200 kPa–2000 kPa.

Structure 18: The molding apparatus according to Structure 14, wherein the pressure-transfer medium is supplied to the clearance at temperature of 100–1000° C.

Structure 19: The molding apparatus according to Structure 14, wherein the pressure-transfer medium is supplied to the clearance at temperature of (T−200° C.)–(T+200° C.), where T represents a glass transition point of a material for the molded products.

Structure 20: The molding apparatus according to Structure 14, wherein there are provided a plurality of supply ports for pressure-transfer medium which supply pressure-transfer media to the clearance between the molding die members and the holding member.

Structure 21: The molding apparatus according to Structure 14, wherein there are provided a plurality of supply ports for pressure-transfer medium which are arranged in the axial direction of the molding die, and there are provided a plurality of supply ports in a plane that is perpendicular to the axial direction.

Structure 22: The molding apparatus according to Structure 20, wherein a distance of the clearance between the molding die members and the holding member is controlled by regulating pressure of the pressure-transfer medium supplied from the plural pressure-transfer medium supply ports.

Structure 23: The molding apparatus according to Structure 22, wherein a shifted eccentricity of the molding die members is controlled by regulating pressure of the pressure-transfer medium supplied from the plural pressure-transfer medium supply ports.

Further, to attain the objectives mentioned above, the molding die of the invention is provided with a pair of molding die members for forming a molding cavity that molds molded products and a holding member that holds therein the molding die members slidably, and it is characterized in that a pressure-transfer medium supplied to the clearance between the molding die members and the holding member makes the molding die members to be slid and held in the holding member while the molding die members and the holding member are on the non-contact state.

The molding die makes pressure-transfer medium to flow through the clearance between the outer circumferential surfaces of molding die members such as a pair of dies and a holding member for a mold plate or a barrel die, and its static pressure holds the molding die member in the holding member on a non-contact basis, thus, an improvement of eccentricity accuracy can be realized and the molding die member can slide smoothly in the axial direction with less friction. Therefore, reproducibility of pressing force of molding die member applied on a molded product in a molding cavity is improved and high accuracy for a thickness of the molded product in the axial direction can be attained. Further, even when inferiority in processing accuracy in the course of processing of the molding die member and the holding member causes the clearance to be large, the molding die member is always positioned at the center of the holding member by the static pressure holding, although holding stiffness is slightly lowered, thus, processing accuracy for parts of the molding die member and the holding member does not have any direct influence on eccentricity accuracy. As stated above, it is possible to improve eccentricity accuracy and accuracy in the axial direction both for molded products without using complicated mechanisms, and highly accurate molded parts can be manufactured stably.

In this case, it is possible to supply the pressure-transfer medium to the clearance from the molding die member side, or the holding member side, or from both the molding die member side and the holding member side.

Further, it is preferable that the clearance to which the pressure-transfer medium is supplied is within a range of 0.1–100 μm. When the clearance is 0.1 μm or more, it is relatively easy to process the holding member and the molding die member, and surface roughness caused by processing does not affect the distribution of pressure, which remains uniform. When the clearance is 100 μm or less, it is possible to obtain sufficient stiffness which holds the molding die member at the center of the holding member against external force. It is more preferable that the clearance is in a range of 3–15 μm.

For the purpose of supplying the pressure-transfer medium, it is possible to provide a supply port which is open to the clearance on at least one of the molding die member and the holding member, and to provide a plurality of the supply ports on the molding die member and the holding member respectively in the axial direction and in the circumferential direction.

It is possible to provide a fixed throttle such as an orifice that regulates a flow of the pressure-transfer medium on the upstream side of the supply port, and to provide an automatic adjusting throttle in a path of pipes provided to supply the pressure-transfer medium. This makes it possible to adjust positively the pressure of the pressure-transfer medium to be supplied. By providing a recess on the circumference of the supply port by denting the circumference portion of the supply port on the molding die member or the holding member on which the supply port is provided, it is possible to increase stiffness. Incidentally, the pressure-transfer medium may be either gas or a liquid, and in the case of gas, it is possible to use nitrogen gas, hydrogen gas or mixed gas thereof to which, however, the invention is not limited. In the case of a liquid, it is possible to use oil and water to which, however, the invention is not limited.

It is further possible to arrange so that at least one of the molding die member and the holding member includes porous material, and the pressure-transfer medium is supplied to the clearance through the porous material. Further, the molding die member and the holding member may be made of ceramic materials. When the molded product is an optical article, it is possible to obtain a highly accurate optical article, and thereby, advanced and highly accurate optical elements such as high NA lenses can be manufactured.

A molding apparatus of the invention is provided with a pair of molding die members for forming a molding cavity that molds molded products and a holding member that holds therein the molding die members slidably, and the molding apparatus is characterized to be equipped with a molding die wherein a pressure-transfer medium supplied to the clearance between the molding die members and the holding member makes the molding die members able to be slid and held in the holding member while the molding die members and the holding member are in the non-contact state, and with a pressure-transfer medium supply means for supplying the pressure-transfer medium to the clearance.

The molding apparatus makes pressure-transfer medium to flow through the clearance between the outer circumferential surfaces of molding die members such as a pair of dies and a holding member for a mold plate or a barrel die with a pressure-transfer medium supply means, and its static pressure holds the molding die member in the holding member on a non-contact basis, thus, an improvement of eccentricity accuracy can be realized and the molding die member can slide smoothly in the axial direction with less friction. Therefore, reproducibility of pressing force of molding die member applied on a molded product in a molding cavity is improved and high accuracy for a thickness of the molded product in the axial direction can be attained. As stated above, it is possible to improve eccentricity accuracy and accuracy in the axial direction both for molded products without using complicated mechanisms, and highly accurate molded parts can be manufactured stably.

The pressure-transfer medium may be either gas or a liquid, and in the case of gas, it is possible to use nitrogen gas, hydrogen gas or mixed gas thereof to which, however, the invention is not limited. In the case of a liquid, it is possible to use oil and water to which, however, the invention is not limited.

It is preferable that the pressure-transfer medium is supplied to the clearance of the molding die under the pressure of 200 kPa–2 Mpa, and 300 kPa–1 Mpa is more preferable. When the pressure is 200 kPa or more, it is possible to obtain holding stiffness caused by sufficient static pressure, while, when the pressure is 2 Mpa or less, a pressure-transfer medium supply means such as a general purpose compressor can be used.

When the pressure-transfer medium is heated up to be in a range of 100° C.–1000° C. to be supplied in the clearance of the molding die mentioned above, heat efficiency for heating a molding die in the course of molding is improved, which is preferable.

In this case, the molded product is an optical article, and it is preferable that the pressure-transfer medium is supplied to the clearance of the molding die after being heated to the temperature in a range of (T−200° C.)–(T+200° C.), when T° C. represents the glass transition point of optical materials for the optical article stated above When the temperature is (T−200° C.) or more, optical materials can be cooled after molding, and thereby, it is possible to prevent generation of internal stress and deformation both caused by cooling contraction and generation of cracking. When the temperature is (T+200° C.) or less, the temperature of the optical materials in the course of molding can be made lower, and thereby, it is possible to prevent occurrence of fog caused by sticking of optical materials on the optical surface of the molding die member or by reaction.

Further, it is preferable to arrange so that a supply port communicated to the clearance of the molding die is provided on at least one of the molding die member and the holding member for supplying the pressure-transfer medium, a plurality of supply ports are provided on the molding die member and the holding member respectively in the axial direction and circumferential direction, and the clearance between the molding die member and the holding member is controlled by adjusting so that a pressure of the pressure-transfer medium at the supply port may be different from those at other supply ports. By controlling the clearance between the molding die member and the holding member as stated above, it is possible to adjust eccentricity of the molding die member against the holding member at each of plural supply ports in the circumferential direction, and it is possible to adjust an inclination of the molding die member in the axial direction against the holding member at each of plural supply ports in the axial direction. Thus, it is possible to adjust eccentricity and inclination of the molding die member, and thereby to mold molded high-accuracy products.

It is preferable to provide a plurality of pressure adjusting mechanisms for the aforesaid pressure adjustment. By providing a plurality of the molding dies, it is possible to conduct simultaneous molding for multiple products, which is suitable for mass production.

A distinguishing feature of the molding method of the invention is to use the molding die or the molding apparatus for molding. Incidentally, as a material for obtaining molded products, any of thermoplastic resins, thermosetting resins, photo-curing resins and glass can be used, independently of types of materials.

The injection molding machine of the invention is characterized to include the molding die or the molding apparatus. Incidentally, the injection molding machine is one wherein materials are heated to be melted, then, are injected into a cavity under the high pressure, and cooled to be solidified so that desired molded products are made.

The injection compression molding machine of the invention is characterized to include the molding die or the molding apparatus. Incidentally, the injection compression molding machine is a molding machine wherein materials are heated to be melted and are injected into a cavity under the high pressure, then, the cavity volume is reduced to transfer the cavity form under the higher pressure, and the materials are cooled to be solidified so that desired molded products are made.

The compression molding machine of the invention is characterized to include the molding die or the molding apparatus. Incidentally, the compression molding machine is a molding machine wherein primary-processed materials are heated and compressed in the cavity so that desired molded products are made.

The glass molding machine of the invention is characterized to include the molding die or the molding apparatus. Incidentally, the glass molding machine is a molding machine wherein glass materials are heated to be melted, and a cavity form is transferred through pressing so that desired molded products are made. Incidentally, as a material for obtaining molded products, any of thermoplastic resins, thermosetting resins, photo-curing resins and glass can be used, independently of types of materials.

Figure 2A:
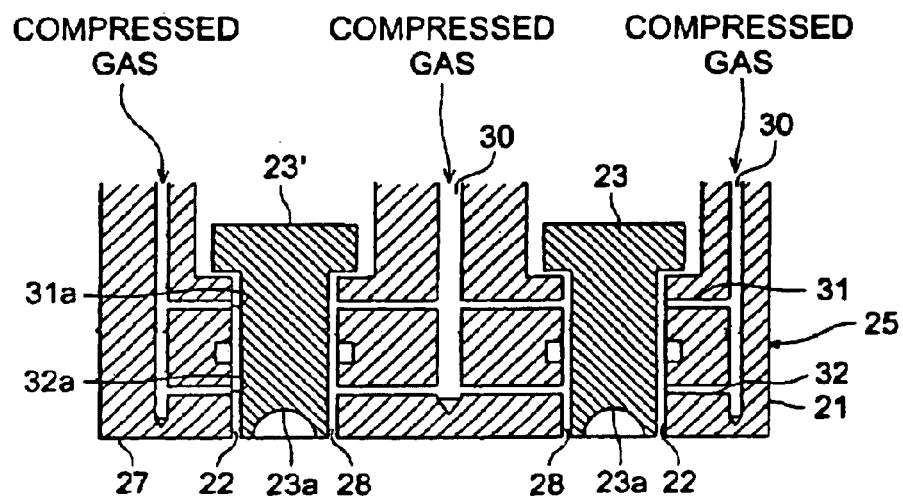
Figure 2B:
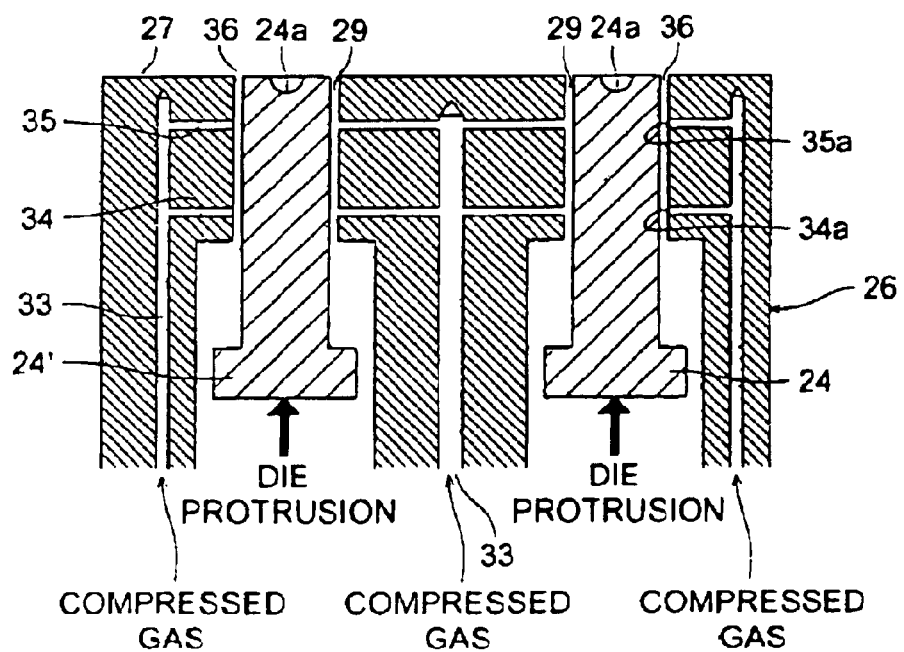

Each of FIGS. 2(a) and 2(b) is a longitudinal section of the molding die of a multi-cavity mold type in the present embodiment.

Figure 3:
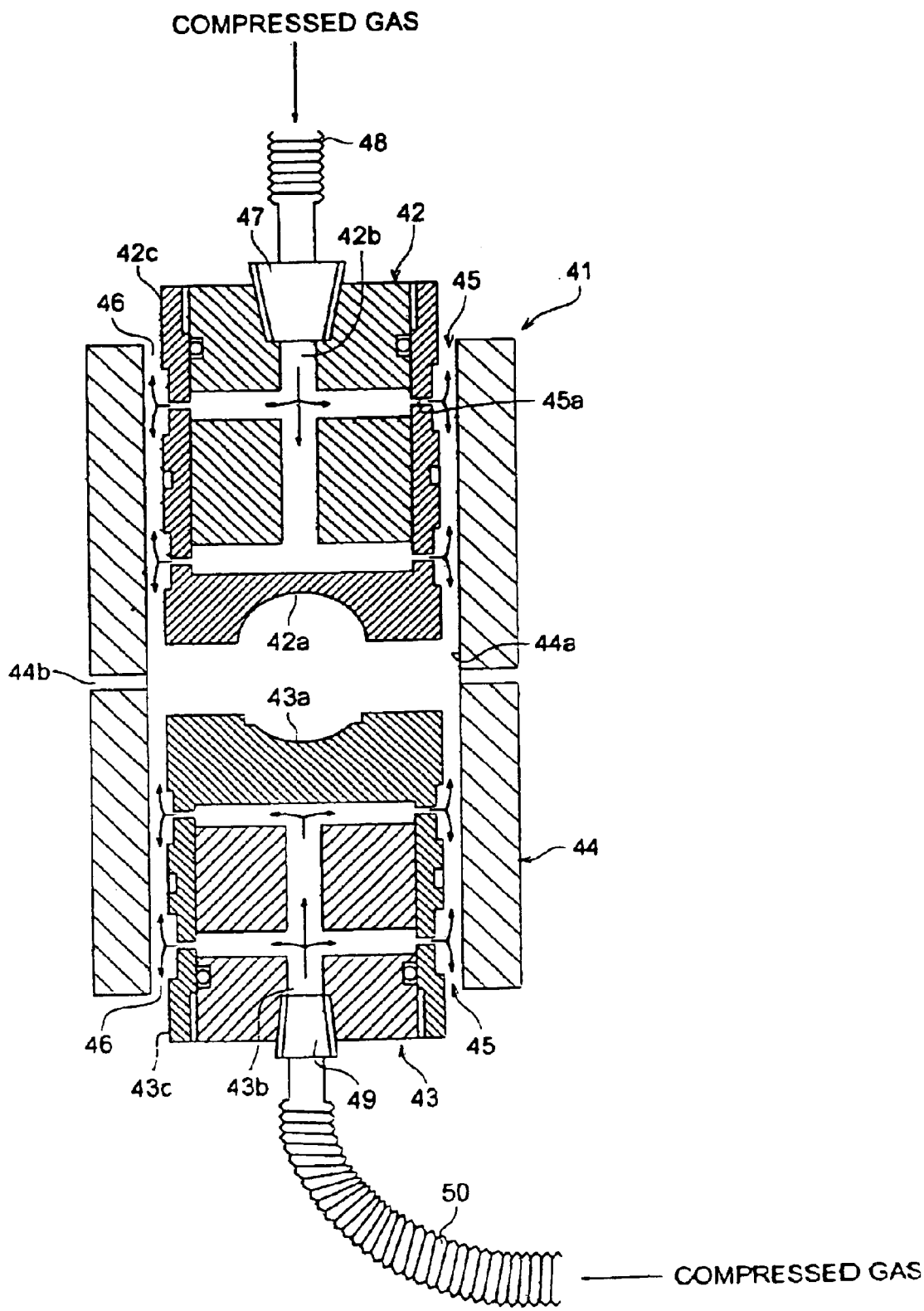

FIG. 3 is a longitudinal section of another molding die in the present embodiment.

Figure 4:
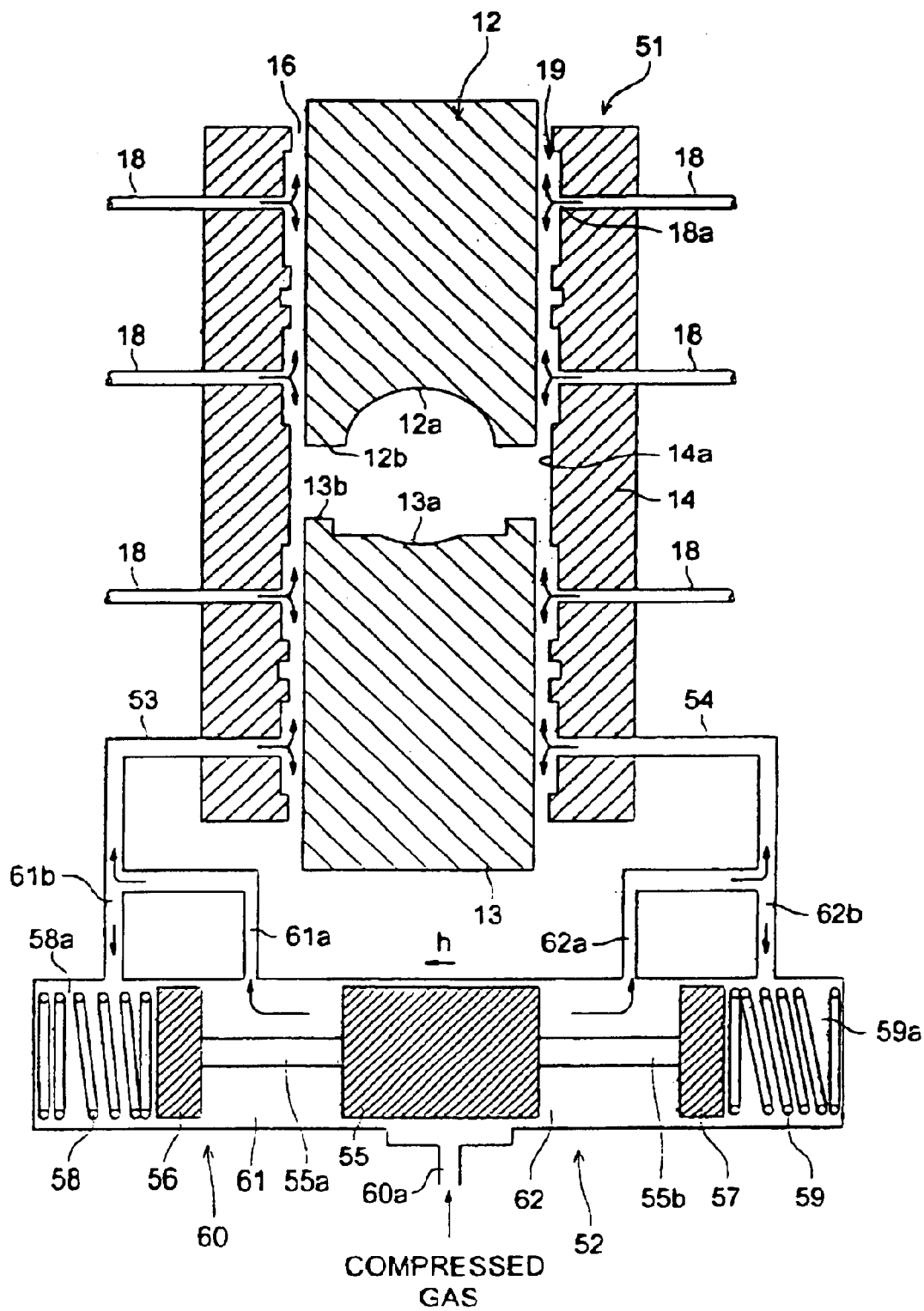

FIG. 4 is a longitudinal section of still another molding die having an automatic adjustment throttle in the present embodiment.

Figure 5:
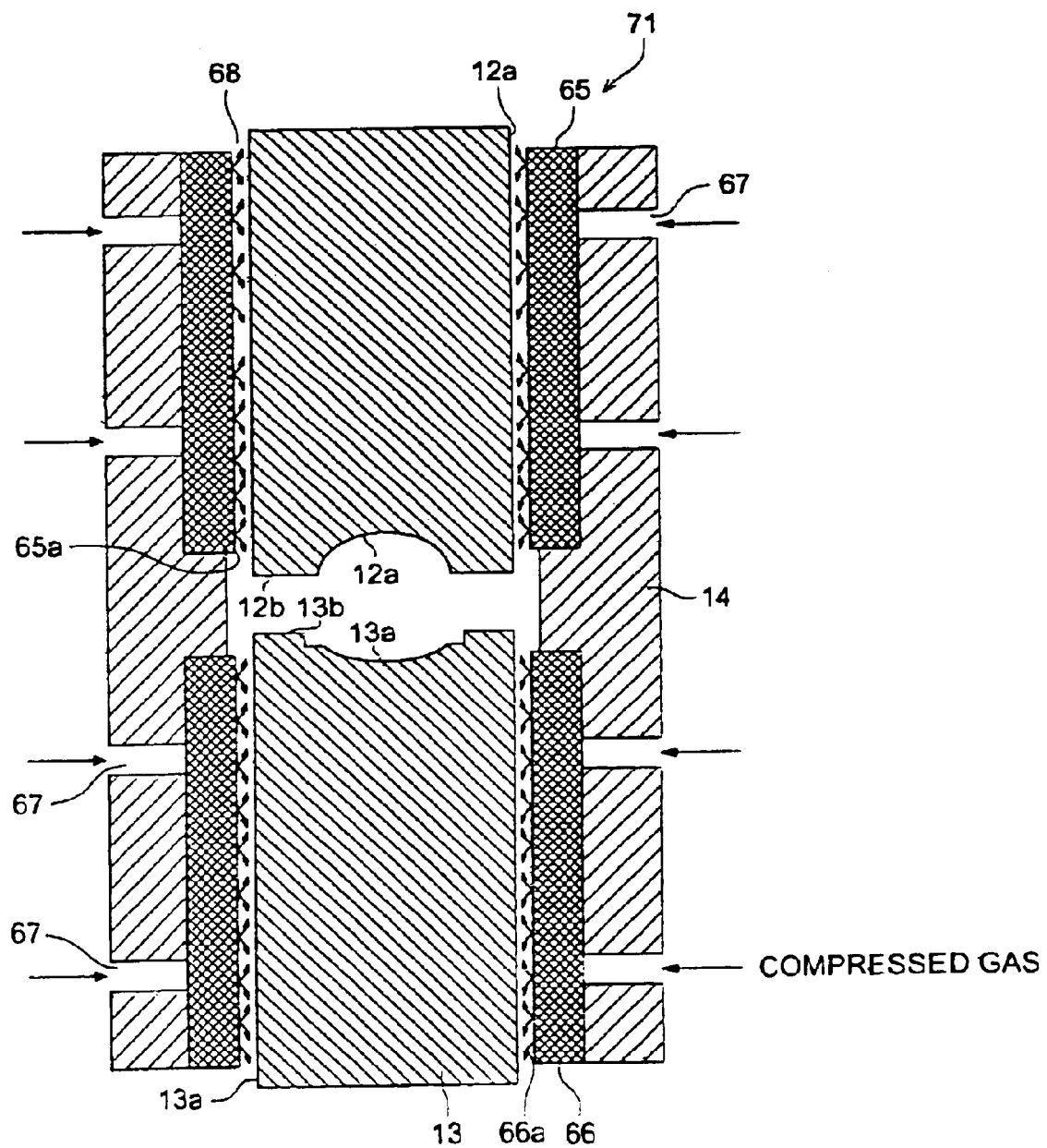

FIG. 5 is a longitudinal section of still another molding die in the present embodiment.

Figure 6:
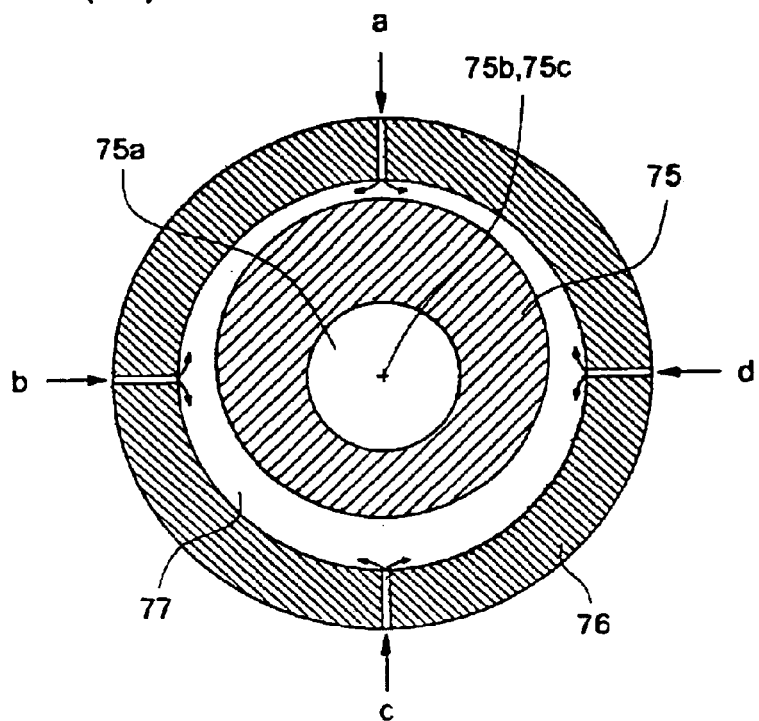
Figure 6:
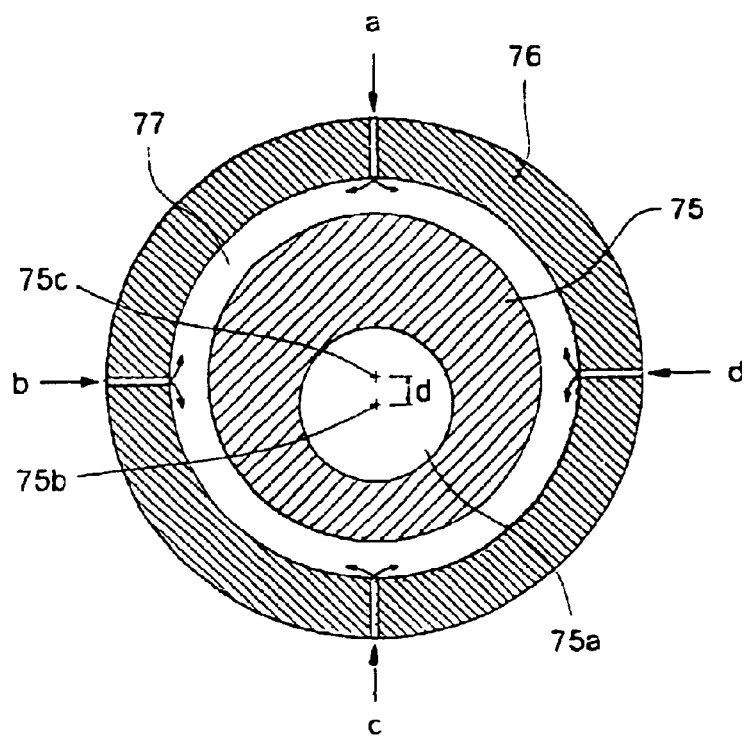

Each of FIGS. 6(a) and 6(b) is a longitudinal section of the molding die for illustrating an example to adjust eccentricity in the present embodiment.

Figure 7:
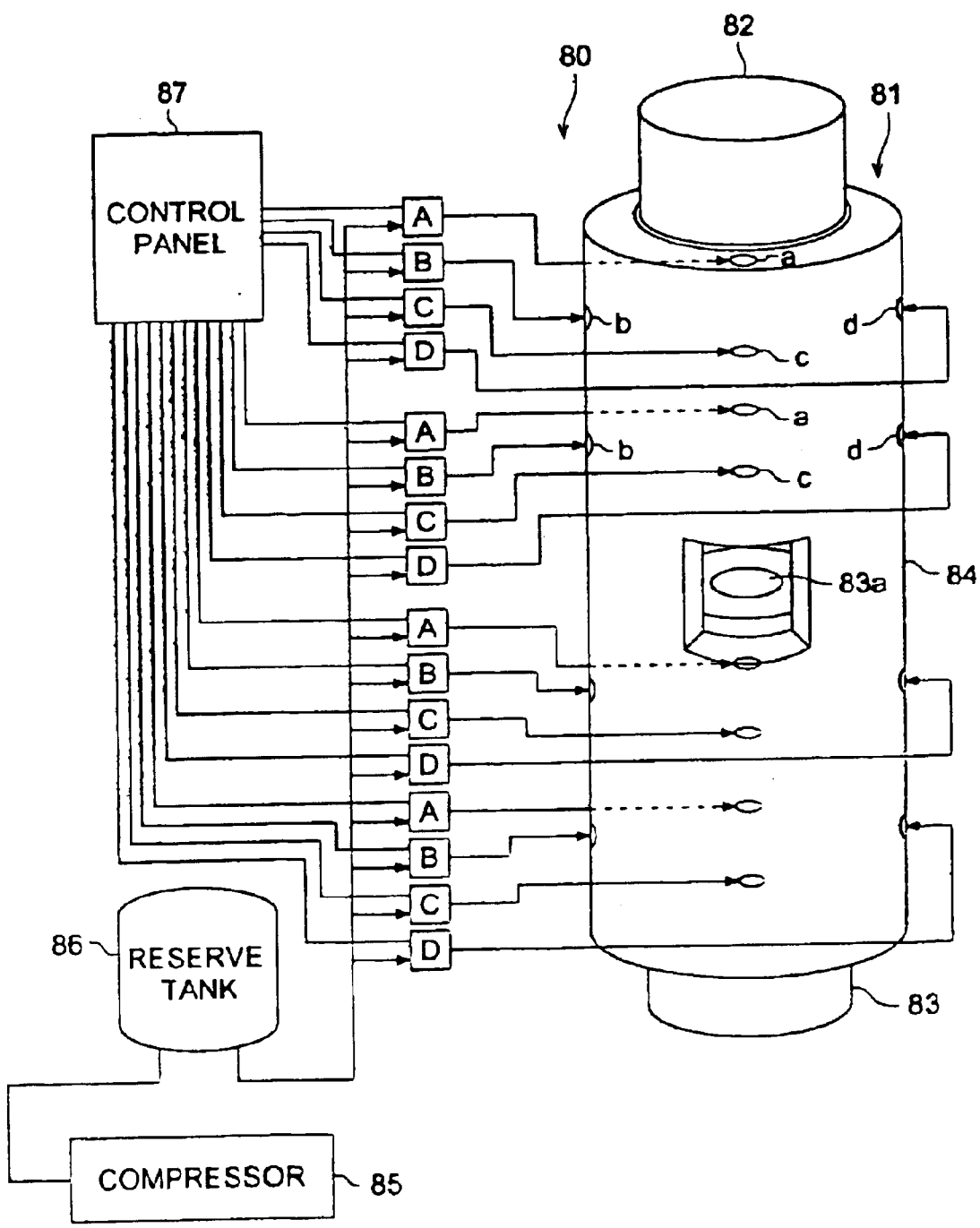

FIG. 7 is a diagram showing the molding apparatus in the present embodiment.

Figure 8:
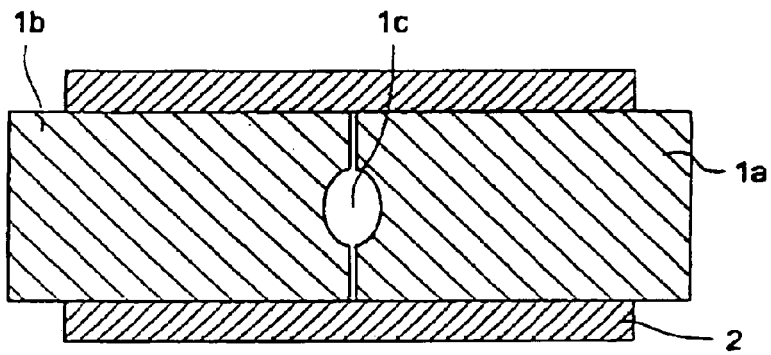

FIG. 8 is a longitudinal section showing a conventional molding die.

Figure 9:
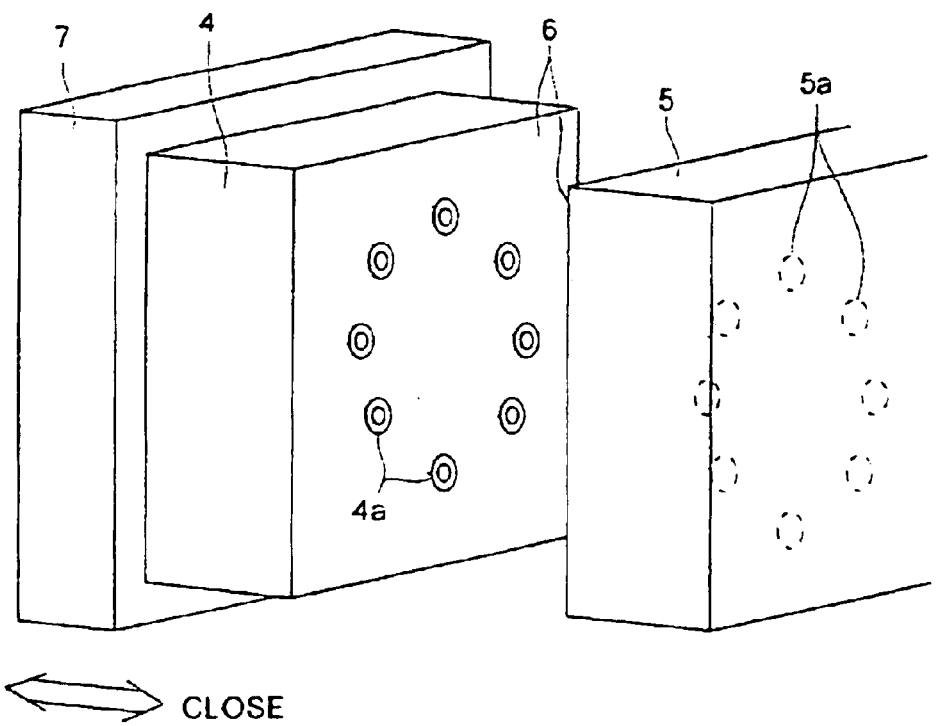

FIG. 9 is a perspective view showing a conventional molding die of a multi-cavity mold type.

Figure 10:
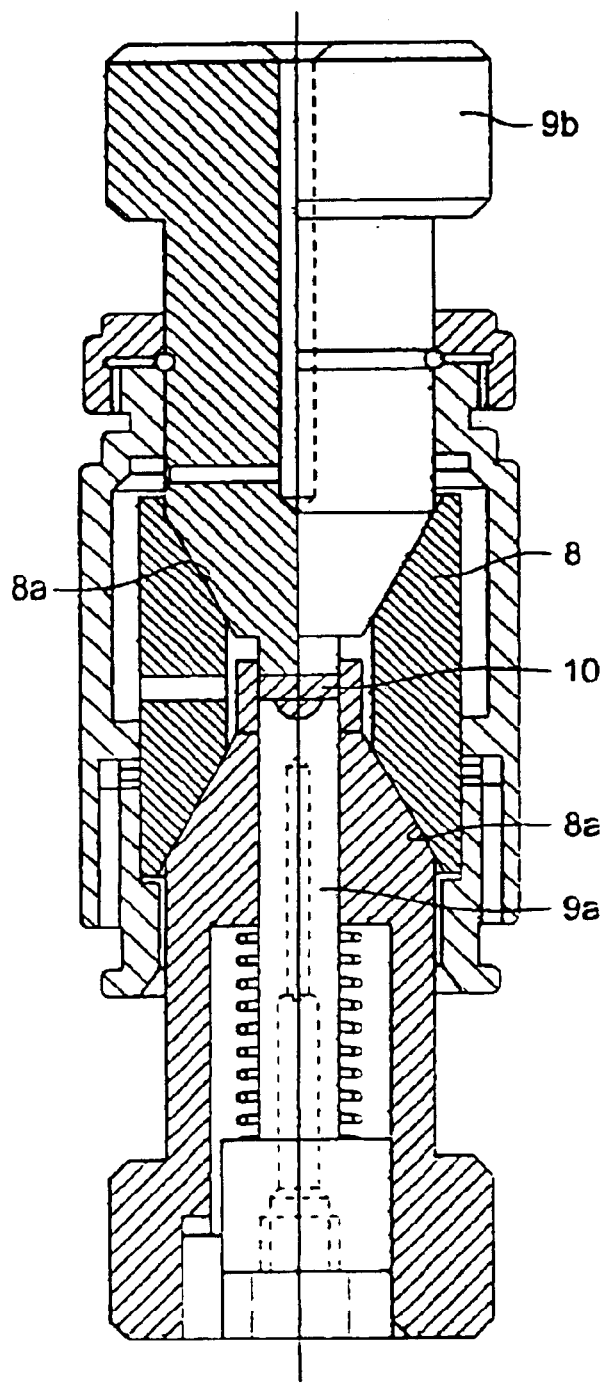

FIG. 10 is a longitudinal section showing another conventional molding die.

DETAILED DESCRIPTION OF THE PREFERRED EMBODIMENT

The molding apparatus of the invention is provided with a molding die having a molding die member and a holding member and with a pressure-transfer medium supply means for supplying pressure-transfer media to a clearance between the molding die member and the holding member The molding die has therein a pair of molding die members which form a molding cavity for molding a molded product and a holding member that holds therein the molding die members slidably. Thus, a pressure-transfer medium supplied to the clearance makes the molding die members able to be slid and held in the holding member while the molding die members and the holding member are in the non-contact state.

Incidentally, it is preferable that the molding die is in a cylindrical shape. For example, shapes such as a circular cylinder, a square pole, a hexagonal pole and an octagonal pole are preferable. It is also preferable that both of the holding member and the molding die member are in a cylindrical shape. The molding die member preferably slides in the cylindrical holding member in its major axis. The direction in which the molding die member slides is sometimes called the axial direction in the specifications. Incidentally, when the molding die member is a circular cylinder, it is preferable to provide a detent on the molding die member and/or the holding member so that the molding die member may not rotate in the holding member.

As a material for molded products in the invention, there are given thermoplastic resins, thermosetting resins, photo-curing resins and glass. When using glass as a material of molded products, for example, when the molding apparatus of the invention is applied to glass molding, it is preferable that melted glass is injected in a set of molding die members before the molding die members in the set come in contact with each other and then the molding die members are slid for molding in the axial direction for pressing. On the other hand, when using resins as a material of molded products, for example, when resins are subjected to injection molding, it is preferable that the molding die members are slid so that they come in contact with each other to form a molding cavity, and then, resins are injected into the cavity for molding. Among these, a problem of eccentricity is especially noticeable in the case of glass molding because molding is conducted while the molding die members are being slid. Therefore, the invention is effective for glass molding in particular. It is preferable that molded products of the invention are optical elements such as a lens and a prism.

Further, the clearance between the molding die member and the holding member which is in a range of 0.1–100 $\mu$m is preferable, and the clearance in a range of 3–15 $\mu$m is more preferable.

It is preferable that a pressure-transfer medium supply port for supplying pressure-transfer media to the clearance between the molding die member and the holding member is provided on the molding die member. The pressure-transfer medium supply port may be provided either on the holding member or the molding die member.

Providing a plurality of pressure-transfer medium supply ports is preferable. Incidentally, it is preferable that a plurality of pressure-transfer medium supply ports are provided in the axial direction of a molding die and a plurality of pressure-transfer medium supply ports are further provided on a plane perpendicular to the axial direction. It is preferable that a distance of the clearance between the molding die member and the holding member is controlled by controlling pressure of the pressure-transfer medium supplied from a plurality of pressure-transfer medium supply ports. For example, a clearance between the molding die member and the holding member can be controlled by making a pressure of the pressure-transfer medium supplied from the pressure-transfer medium supply port on one side to be different from that of pressure-transfer medium supplied from the pressure-transfer medium supply port on the other side, among a plurality of pressure-transfer medium supply ports.

It is preferable to control shift eccentricity of the molding die member by controlling pressure of pressure-transfer media supplied from a plurality of pressure-transfer medium supply ports (preferably, a plurality of pressure-transfer medium supply ports located on a plane perpendicular to the axial direction). In other words, lateral slip of the molding die member can be controlled. Further, it is preferable to control tilt eccentricity of the molding die member by controlling pressure of pressure-transfer media supplied from a plurality of pressure-transfer medium supply ports (preferably, a plurality of pressure-transfer medium supply ports located in the axial direction). In other words, inclination of the molding die member can be controlled.

It is preferable that a pressure-transfer medium supply path communicated with the pressure-transfer medium supply port is provided, and a fixed throttle for regulating a flow of pressure-transfer medium is provided on the pressure-transfer medium supply path. As a fixed throttle, there is given an orifice. It is further preferable that a circumference portion of the pressure-transfer medium supply port is dented so that a recess is provided. An automatic adjustment throttle may also be provided on the pressure-transfer medium supply path.

Further, the molding die member or the holding member may also have a porous member so that pressure-transfer medium is supplied to the clearance through the porous member.

The molding die member or the holding member may be made either of metal or of ceramic material. Though the molding die member and the holding member are preferably made of the same member, they may also be different each other.

Further, it is preferable that a pressure-transfer medium is gas such as compressed air, nitrogen gas and hydrogen gas, or a liquid such as water and oil. The pressure-transfer medium may also be supplied under the pressure of 200 kPa–2000 kPa. The pressure of 300 kPa–1000 kPa is preferable. Further, a pressure-transfer medium may also be supplied to the clearance at temperature of 100° C.–1000° C. Further, when T° C. represents the glass transition point, pressure-transfer medium is preferably supplied to the clearance at the temperature in a range of (T–200° C.)–(T+200° C.).

Figure 1:
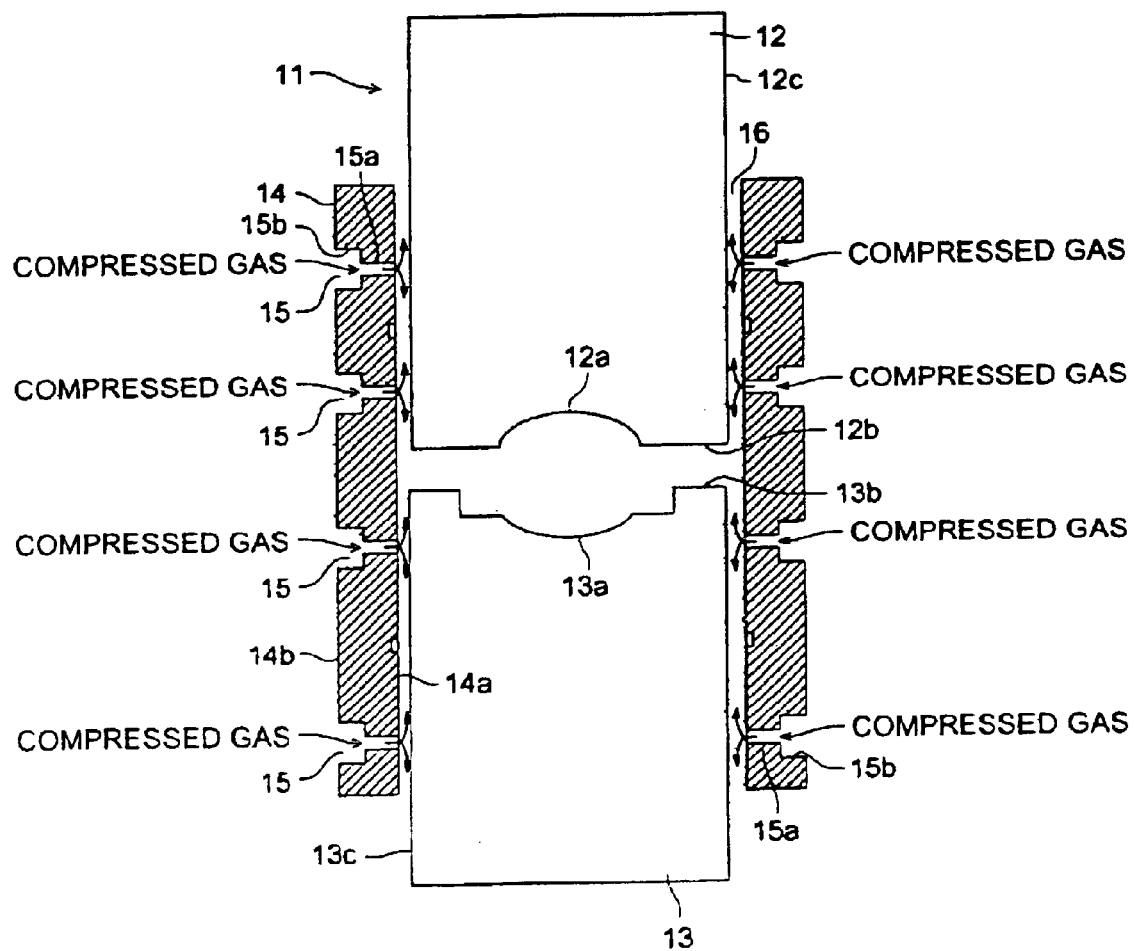
FIG. 1 is a longitudinal section of the molding die in the present embodiment.

An embodiment of the invention will be explained as follows, referring to the drawings. FIG. 1 is a longitudinal section of the molding die showing an embodiment of the invention.

Molding die 11 shown in FIG. 1 is provided with a pair of dies (molding die members of the invention) 12 and 13 for a single-cavity mold and with cylindrical barrel die member (holding member of the invention) 14 that holds therein the dies 12 and 13 slidably. Between outer circumferential surfaces of the dies 12 and 13 and an inner circumferential surface 14a of the barrel die member 14, there is formed clearance 16. Each of the dies 12 and 13 has each of optical surfaces 12a and 13a each forming a surface of an optical article in the course of molding, and a molding cavity is formed by optical surfaces 12a and 13a when butting surface 13b of the die 13 butts against surface 12b of the die 12.

On the barrel die member 14, there are formed a plurality of supply ports 15 representing through holes for supplying pressure-transfer media to clearance 16 both in the axial direction (direction in which the die slides) and the circumferential direction (in a plane perpendicular to the axial direction). In order to let compressed gas representing pressure-transfer medium to flow to inner circumferential surface 14a from the outer circumferential surface 14b side of the barrel die member 14, each supply port 15 is provided with large diameter portion 15b and orifice portion 15a that is narrowed to a small diameter so that compressed gas may be jetted out to clearance 16.

When compressed gas such as nitrogen gas flows to supply port 15 from a compressor representing a pressure medium transfer means that is outside molding die 11, the nitrogen gas jets out to the clearance 16 from the orifice portion 15*a*. This compressed gas makes the clearance 16 to be a static pressure film, and thereby, dies 12 and 13 are pressed by the compressed gas from the barrel die member 14 on an isotropic basis to be positioned at the center of the barrel die member. If dies 12 and 13 are shifted by external force to be eccentric, gas pressure in the narrowed clearance rises and pressure in the broadened clearance falls, thus, the force to bring the dies 12 and 13 back to the center is applied, and centering of the dies 12 and 13 is conducted. The stiffness of the centered dies 12 and 13 is inversely proportional to the distance of clearance 16, and is proportional to pressure for supplying gas and to an area of static pressure film, and it is dependent on the structure of a supply opening.

When clearance 16 between dies 12 and 13 and barrel die member 14 is within a range of 0.1–100 $\mu$m, it is possible to obtain an effect to maintain the static pressure, and the smaller the clearance is, the higher the stiffness to hold the dies 12 and 13 at the center of the barrel die member 14 against external force is. However, if the clearance is too small, processing of outside diameters respectively of the dies 12 and 13 on outer circumferential surfaces 12*c* and 13*c* and processing of an inside diameter of the barrel die member 14 on its inner circumferential surface 14*a* are made to be more difficult, distribution of the pressure surrounding the dies 12 and 13 tends to be affected by roughness of the processed surface and it loses uniformity, and pneumatic hammer is generated by compressibility of compressed gas to cause generation of vibration. Taking the foregoing into consideration, the clearance 16 that is in a range of about 3–15 $\mu$m is preferable. This clearance amount makes it possible to obtain an inside diameter and cylindricity of the barrel die member 14 and outside diameters and cylindricity of the dies 12 and 13 under the relatively easy processing. Moreover, even if the clearance is made to be greater by poor processing accuracy, the dies 12 and 13 are always positioned at the center of the barrel die member 14 in accuracy of 1 $\mu$m or less, though holding stiffness is lowered, which exhibits an effect that accuracy of eccentricity is not affected directly by accuracy for processing parts.

With regard to the pressure for supplying gas, an atmospheric pressure of about 200 kPa–2 Mpa is generally easy to be handled, and 300 kPa–1 Mpa is more preferable.

When the die and the barrel die member are in a columnar shape, increasing of an area of a static pressure film is to increase a sliding area between the die and the barrel die member by making the die diameter large and by lengthen it, and with regard to processing of an inner circumferential surface of the barrel die member, it is easy to make by a conventional method when a ratio (L/D) of length L to diameter D is up to about 5.

Further, compressed gas may either be supplied from the barrel die member side to the clearance as shown in FIG. 1, or be supplied from the inside of the die to the clearance. In the case of the former, relatively many barrel die parts are used in common even when an article to be molded is changed, and piping is conducted toward an outside diameter. Therefore, processing is easy and a room for space is easy to be taken. In the case of the latter, processing is complicated because piping is conducted under the restriction of a size of the die, but when supplying compressed gas after heating it for heating the die, heat efficiency is excellent, which is a distinctive feature. Further, the compressed gas may also be supplied to the clearance from both the die and the barrel die member.

Next, the example applied to a multi-cavity mold will be explained as follows, referring to FIGS. 2(*a*) and 2(*b*). Each of FIGS. 2(*a*) and 2(*b*) shows a molding die of a multi-cavity mold type, and a sectional view of the die and the fixed side mold plate (barrel die) is shown in the sectional view of FIG. 2(*a*), while, a sectional view of the die and the movable side mold plate is shown in the sectional view of FIG. 2(*b*). Incidentally, the fixed side mold plate and the movable side mold plate represent a holding member in the present embodiment.

As shown in FIG. 2(*a*), molding die 21 is equipped, on its fixed side, with a plurality of dies 23 and 23' each having recessed molding surface 23*a* for forming a molding cavity and with fixed side mold plate 25 wherein holes 22 and 22 into which the plural dies 23 and 23' are inserted to be held slidably. In the fixed side mold plate 25, there are formed supply paths 30, 31 and 32 for supplying pressure-transfer media, and the supply paths 30 is communicated with a compressor representing an outer pressure medium transfer means, and is communicated with plural supply paths 31 and 32 in the fixed side mold plate 25. The supply paths 31 and 32 respectively have supply ports 31*a* and 32*a* each being opened to be communicated with an inner circumferential surface of each hole 22 so that compressed gas representing pressure-transfer medium may be supplied to clearance 28 formed between each of the dies 23 and 23' and each of the holes 22 and 22 from each of the supply ports 31*a* and 32*a*.

As shown in FIG. 2(*b*), molding die 21 is equipped, on its movable side, with a plurality of dies 24 and 24' each having recessed molding surface 24*a* for forming a molding cavity and with movable side mold plate 26 wherein holes 36 and 36 into which the plural dies 24 and 24' are inserted to be held slidably. In the fixed side mold plate 26, there are formed supply paths 33, 34 and 35 for supplying pressure-transfer media, and the supply paths 33 is communicated with a compressor representing an outer pressure medium transfer means, and is communicated with plural supply paths 34 and 35 in the movable side mold plate 26. The supply paths 34 and 35 respectively have supply ports 34*a* and 35*a* each being opened to be communicated with each hole 36 so that compressed gas representing pressure-transfer medium may be supplied to clearance 29 formed between each of the dies 24 and 24' and each of the holes 36 and 36.

In the molding die 21 stated above, the fixed side molding plate 25 is brought face to face with the movable side molding plate 26 with parting planes 27 and 27 between them to be closed, and then, compressed gas such as nitrogen gas is supplied from a compressor representing an outer pressure medium transfer means to clearance 28 through supply paths 30, 31 and 32 in the case of the fixed side molding plate 25, while, compressed gas is supplied to clearance 29 through supply paths 33, 34 and 35 in the case of the movable side molding plate 26. In virtue of this, a static pressure film is formed in clearance 28 and in clearance 29 each formed between a die and a hole. In virtue of this, eccentricity accuracy is 1 $\mu$m or less for a hole on a mold plate of a die in the same way as in the occasion shown in FIG. 1, and a limit value that is not more than two-thirds may be obtained despite parts processing accuracy which is the same as that in the past, because those having processing errors of 5 $\mu$m that is the same as in the past are represented by only positional accuracy of each hole on the mold plate.

Next, an example of a molding die wherein pressure-transfer medium is supplied to a clearance from the molding die member side will be explained as follows, referring to FIG. 3. Molding die 41 shown in FIG. 3 is equipped with a pair of dies 42 and 43 having respectively molding surfaces 42*a* and 43*a* each forming a molding cavity and with barrel die member 44 that holds therein the dies 42 and 43 slidably. Inside each of the dies 42 and 43, there are formed supply paths 42*b* and 43*b* through which compressed gas such as pressure-transfer medium passes are formed in the axial direction and the radial direction. On the outer circumferential surfaces 42c and 43c respectively of the dies 42 and 43, there are formed a plurality of supply ports 45a for compressed gas respectively in the axial direction and the circumferential direction, and each supply port 45a is communicated with supply path 42c or 43c. On the outer circumferential surfaces 42c and 43c located in the vicinity of the circumference of each supply port 45a, there is formed recess 45 that is engraved to be in a depth of about 5–50 μm. Further, flexible hoses 48 and 50 which are made of metal are screwed to end surfaces of dies 42 and 43 to be communicated with supply paths 42b and 43b through connection portions 47 and 49. After die-closing the dies 42 and 43, compressed gas is made to flow to supply paths 42b and 43b through the flexible hoses 48 and 50, then, the compressed gas flows from each supply port 45a to clearance 46 formed between inner circumferential surface 44a of barrel die member 44 and outer circumferential surfaces 42c and 43c respectively of the dies 42 and 43, and a static pressure film is formed in the clearance 46. Incidentally, exhaust holes 44b are provided on the barrel die member 44.

Molding die 41 shown in FIG. 3 makes it possible to obtain an effect which is the same as that in FIG. 1. By virtue of recess 45, no pressure loss is caused on pressure-transfer medium at the recess portion to produce supply pressure approximately. Thus, it is possible to increase stiffness.

Next, in the present example, when the die and the barrel die member are not too big for a size of molded products such as a desired optical element, the heat capacity of the die member can be controlled to be low, heat supply in the course of molding by cooling and solidifying molding materials such as optical materials is small, and not only energy efficiency is high but also thermal inertia is small, which makes temperature control that is highly responsive and highly accurate to be possible. However, stiffness for receiving static pressure is proportional to the area which receives the pressure, and therefore, it is advantageous for eccentricity regulation of the die member to make the die and the barrel die member to be large as far as possible, but thermal advantages are lowered. Therefore, two types of devices for enhancing eccentricity stiffness were tried without making the die and the barrel die member large. Incidentally, the eccentricity stiffness means the so-called resistance against eccentricity.

One of the devices is one wherein a fixed throttle is provided before a supply opening in piping for compressed gas, and the other is one wherein an automatic adjustment throttle is provided as shown in the following FIG. 4. Though these methods are known as a method to make a static pressure bearing to be of high stiffness, it is possible to secure sufficient stiffness while keeping the die and the barrel die member to be small, by using the aforesaid methods for an eccentricity regulation means on molded optical surfaces in the present example.

As a fixed throttle, there may be given those of a capillary tube system and an orifice system. In the capillary tube system, a thin and long throttle is installed in piping, and when the fitting clearance is narrowed by the eccentricity caused by external force, back pressure of compressed gas is increased to push it back, but an amount of pushing back is reduced by viscous resistance of a flow in the capillary tube and by restriction of flux, thus, the back pressure is enhanced and force to push back is increased. The orifice system is one to provide a small hole in piping and thereby to improve stiffness by restriction of flux of compressed gas. In either case, a means of a fixed throttle does not matter in the invention. In general, stiffness is increased to the level that is about 1.5 times–2 times that of the stiffness by providing a fixed throttle, and this means that diameters of the die and the barrel die member may be halved under the condition of the same eccentricity stiffness in the present embodiment, and a volume is made to ¼ thereof, which is highly effective in the control of thermal molding conditions.

The automatic adjustment throttle is a system to adjust positively pressure of compressed gas to be supplied by driving a servo valve or a diaphragm valve through variation of a clearance and pressure. What is shown in FIG. 4 is a differential valve which is a kind of a spool valve and is called an MIT valve, and it adjusts flux by changing valve overlapping rate through a difference of back pressure in piping for supplying face to face, and thereby increases further the pressure in a higher back pressure. As an adjustment method, a diaphragm valve may be used in addition to the type of the spool valve, or it is possible to increase stiffness by conducting pressure adjustment with an electric servo valve after detecting eccentricity with a sensor. In the present embodiment, the method stated above does not matter and it includes all the automatic adjustment throttles which enhance stiffness by changing jetting pressure for compressed gas or flux positively, and contribute to miniaturization of a die and a barrel die.

Next, an example wherein an automatic throttle is provided on a molding die that is almost the same as that in FIG. 1 will be explained as follows, referring to FIG. 4. Molding die 51 shown in FIG. 4 is equipped with a pair of dies 12 and 13 which are the same as those in FIG. 1, barrel die member 14 that holds therein the dies 12 and 13 slidably and with an automatic adjustment throttle mechanism 52 On the barrel die member 14, there are formed a plurality of supply paths 18 for pressure-transfer medium in both the axial direction and the circumferential direction, and each supply paths 18 has supply port 18a opened to inner circumferential surface 14a of the barrel die member 14, and in the vicinity of each supply port 18a, there is formed recess 19 that is the same as one in FIG. 3.

In the automatic adjustment throttle mechanism 52, at mostly the center in cylinder 60, there is housed slidably piston 55 which divides the cylinder into first chamber 61 and second chamber 62. The piston 55 is connected with first disk portion 56 through connection rod 55a in the first chamber 61, and the piston 55 is further connected with second disk portion 57 through connection rod 55b in the second chamber 62. Coil spring 58 is arranged between one end of the cylinder 60 and the first disk portion 56, and coil spring 59 is arranged between the other end of the cylinder 60 and the second disk portion 57. Communication path 53 communicated with clearance 16 of a molding die is communicated with the first chamber 61 through path 61a, and is further communicated with chamber 58a housing therein coil spring 58 through path 61b. In the same way, communication path 54 communicated with clearance 16 of a molding die is communicated with the second chamber 62 through path 62a and is further communicated with chamber 59a housing therein coil spring 59 through path 62b.

In FIG. 4, when compressed gas is supplied from inlet 60a of the cylinder 60 into the cylinder 60, the compressed gas is supplied to clearance 16 through the first chamber 61, path 61a and communication path 53 and further supplied to chamber 58a through path 61b. This applies also to the second chamber 62 side. When there is no fluctuation of pressure in clearance 16, the piston 55 stays at its neutral position shown in the drawing. However, when the clearance 16 is broadened on the communication path 53 side and pressure is lowered, for example, if the piston 55 is moved in direction h in the drawing by the higher pressure in the second chamber 62 and by back pressure difference against compression restoring force, an opening of path 61a is closed. Due to this, a flow of compressed gas to the communication path 53 side of clearance 16 is throttled down and pressure is further lowered and pressure on the communication path 54 side is further raised, thus, it is possible to adjust clearance 16 on the communication path 53 side to be narrower. In virtue of this, pressure of compressed gas to be supplied can be adjusted positively.

Even when a distance in clearance 16 is fluctuated and pressure is changed accordingly, it is possible, in the aforesaid manner, to adjust pressure automatically and thereby to restore the distance of the clearance 16 by regulating the supply of compressed gas to the communication path on one side.

Next, an example wherein a porous member is provided on a molding die that is almost the same as that in FIG. 1 will be explained as follows, referring to FIG. 5. Molding die 71 shown in FIG. 5 is equipped with a pair of dies 12 and 13 which are the same as those in FIG. 1, barrel die member 14 that holds therein the dies 12 and 13 slidably and with cylindrical porous members 65 and 66 arranged on an inner circumferential surface of the barrel die member 14.

Compressed gas representing pressure-transfer medium supplied from plural supply paths 67 formed in both the axial direction and the circumferential direction enters porous members 65 and 66 from it supply port and is supplied to clearance 68 from inner circumferential surfaces 65a and 66a of the porous members 65 and 66. In virtue of this, the same effect as in FIG. 1 can be obtained.

Next, eccentricity adjustment at the center of a die (molding die member) in the aforesaid molding die will be explained as follows, referring to FIGS. 6(a) and 6(b).

When center 75b of optical surface 75a formed on die 75 is deviated from center 75c of die 75 as shown in FIG. 6(b) in which accurate molding is difficult, compressed gas is supplied to clearance 77 by making pressure at supply port c that is opposite by 180° to supply port a to be higher than that at the supply port a in supply ports a, b, c and d for compressed gas provided at regular intervals of 90° in the circumferential direction of barrel die member 76, as shown in FIG. 6(a). By virtue of this, it is possible to make center 75b of optical surface 75a and center 75c of die 75 to agree with each other, and thereby to make highly accurate molding possible. By controlling the pressure at each of supply ports a, b, c and d appropriately as stated above, it is possible to adjust the center 75b of optical surface 75a so that it may agree with a center of barrel die member 76. An adjustment of this kind which has been almost impossible in the conventional die structure can be can be conducted easily by the invention.

Next, a molding apparatus equipped with a plurality of pressure adjustment mechanisms for pressure adjustment in FIGS. 6(a) and 6(b) will be explained as follows, referring to FIG. 7.

Molding apparatus 80 in FIG. 7 is equipped with molding die 81 having therein a pair of dies 82 and 83 and barrel die member 84, compressor 85 that supplies compressed gas to a clearance between dies 82 and 83 and barrel die member 84 in molding die 81, reservoir tank 86 for making pressure of compressed gas from the compressor 85 to be constant, plural servo valves A, B, C and D each supplying, by controlling pressure, compressed gas to each of plural supply ports a, b, c, and d (FIGS. 6(a) and 6(b)) for compressed gas provided on barrel die member 84, and with control panel 87 for controlling each servo valve.

It is possible to conduct pressure adjustment explained in FIGS. 6(a) and 6(b) by controlling each servo valve by means of control panel 87 and by adjusting pressure at each of plural supply ports a, b, c and d. A tilt of the die can also be corrected by changing pressure at each of supply ports provided stepwise in the axial direction.

EXAMPLE

Next, there will be explained an example conducted on a multi-cavity molding die such as one shown in FIGS. 2(a) and 2(b) under the restriction of the conventional parts processing accuracy.

Example 1

A pair of steel dies each having a diameter of 50 mm, a length of 60 mm and cylindricity of 1 $\mu$m and a steel barrel die having a clearance of 10 $\mu$m were used, and they were held by jetting nitrogen gas at 10 at. from a supply port having a diameter of 1.5 mm on the outer surface of the die. As a supply port of compressed gas, there were provided 6 orifices in total on two steps including 3 orifices provided at 3 positions equally distributed in the circumferential direction on one step on a die.

In this case, eccentricity between the dies when they faced each other was 0.5 $\mu$m. The repeated reproducibility of this amount of eccentricity was 0.05 $\mu$m, and eccentricity of 0.5 $\mu$m was reproduced firmly as an eccentricity error. Stiffness against external force was 120 N/$\mu$m which was a sufficient value for the force in the shifting direction which is hardly applied in ordinary molding. In addition, when the dies were butted by applying the force of 30 N on the rear end of each die, the dies slid extremely smoothly in the barrel die, and total length of butted two dies was reproduced at dispersion of 0.3 $\mu$m or less. In other words, reproducibility of the cavity thickness that determines a thickness of a molded article in the case of press molding was made to be extremely high, because the force applied was turned out to be butting force with excellent reproducibility without being lost.

Thus, reproducibility of eccentricity and of butting in the axial direction in the invention has been improved from the limit in the conventional die structure to the level that is 10 times better than that limit, and in particular, even when processing accuracy for a hole diameter of a barrel die and an outer circumferential surface of a die wherein tolerances have been kept to be severe is eased, accurate reproducibility can be obtained, and when manufacturing a die and a barrel die using a hard-processing material such as ceramics, in particular, tremendous reduction of parts processing manhour and tremendous easiness result.

Example 2

An orifice having a diameter of 0.2 mm and a length of 5 mm was provided on a supply port on the die from which nitrogen gas is jetted in Example 1 stated above, and a recess of 10×20 mm having a depth of 50 $\mu$m was provided on the circumference of the orifice. Stiffness against external force was improved to 256 N/$\mu$m.

Example 3

Nitrogen gas heated up to 600° C. was supplied at 7 at. by using a pair of ceramic dies each having a diameter of 50 mm, a length of 60 mm and cylindricity of 2 $\mu$m and a ceramic barrel die having therein porous ceramic with a fitting clearance of 10 $\mu$m provided. There were provided 16 supply ports in total for nitrogen gas in a portion on a barrel die equivalent to two dies including 8 supply ports on two steps on a portion on a barrel die equivalent to one die each step having 4 supply ports provided at 4 positions equally distributed in the circumferential direction on one barrel die. The temperature on the butting surface under the condition of the distance between dies of 10 mm was 556° C. Shift eccentricity accuracy was 1.2 μm and reproducibility was not more than 0.03 μm. Stiffness in the shifting direction was 185 N/μm. When supply pressure for nitrogen gas in the eccentricity direction for the die on one side was raised by 0.3 at. for correcting shift eccentricity, the shift eccentricity was reduced to 0.3 μm. Further, the reproducibility for the total length of the die when the opposing die was butted with force of 30 N was not more than 0.5 μm. Thus, heating temperature for glass sufficient for molding an optical element was obtained, and smooth die sliding an butting having hardly eccentricity was obtained with excellent reproducibility.

The invention has been explained as stated above, referring to embodiments to which the invention is not limited, and the embodiment can be varied in many ways without departing from the spirit and scope of the invention. For example, liquids such as water and various kinds of oils may naturally be used as pressure-transfer medium, in addition to gas. Further, the sectional form of a die does not always need to be a circle, and it may naturally be a shape of a polygon such as a square or a hexagon which restricts rotation of the die in the barrel die member.

The invention makes it possible to improve eccentricity accuracy and accuracy in the axial direction of molded parts without using complicated mechanism, and to provide a molding die, a molding apparatus, a molding method, an injection molding machine, an injection compression molding machine, a compression molding machine, a glass molding machine and a molding method, all having the mold structure which makes it possible to manufacture highly accurate optical elements and molded parts stably.

Disclosed embodiment can be varied by a skilled person without departing from the spirit and scope of the invention.

What is claimed is:

1. A molding die comprising:
   a pair of molding die members that forms a molding cavity that molds molded products;
   a holding member that holds therein the pair of molding die members slidably, an inner surface of the holding member and an outer surface of the pair of molding die members being separated by a clearance;
   a plurality of supply ports that supply a pressure-transfer medium located on one of the inner surface of the holding member and the outer surface of the pair of molding die members; and
   a static pressure film of the pressure-transfer medium, the static pressure film filling the clearance;
   wherein the pair of molding die members are configured to be slid or held in the holding member by the static pressure film while the pair of molding die members and the holding member are in a non-contact state.

2. The molding die of claim 1, wherein the clearance between the pair of molding die members and the holding member is within a range of 0.1–100 μm.

3. The molding die of claim 1, wherein the pressure-transfer medium is gas or liquid.

4. The molding die of claim 1, further comprising a supply path for the pressure-transfer medium connected to the plurality of supply ports; and
   a fixed throttle provided on the supply path for regulating a flow of the pressure-transfer medium, and
   wherein the plurality of supply ports are provided on one of the pair of molding die members for supplying the pressure-transfer medium to the clearance between the pair of molding die members and the holding member.

5. The molding die of claim 1, wherein the plurality of supply ports are provided on one of the pair of molding die members for supplying the pressure-transfer medium to the clearance between the pair of molding die members and the holding member,
   wherein a circumference of at least one of the plurality of supply ports is recessed.

6. The molding die of claim 1, further comprising a supply path for the pressure-transfer medium connected to the plurality of supply ports; and
   an automatic adjusting throttle provided on the supply path;
   wherein the plurality of supply ports are provided on the holding member for supplying the pressure-transfer medium to the clearance between the pair of molding die members and the holding member.

7. The molding die of claim 1, wherein at least one of the supply ports is a porous member through which the pressure-transfer medium is supplied to the clearance.

8. The molding die of claim 1, wherein at least one of the pair of molding die members or the holding member is made of ceramic material.

9. The molding die of claim 1, wherein the molded products are optical elements.

10. A molding apparatus comprising:
    a molding die comprising,
      a pair of molding die members that form a molding cavity for molding molded products,
      a holding member that holds therein the pair of molding die members slidably, an inner surface of the holding member and an outer surface of the pair of molding die members being separated by a clearance,
      a plurality of supply ports that supply a pressure-transfer medium located on one of the inner surface of the holding member and the outer surface of the pair of molding die members, and
      a static pressure film of the pressure-transfer medium, the static pressure film filling the clearance; and
    a pressure-transfer medium supplying means for supplying the pressure-transfer medium to the clearance between the molding die member and the holding member,
    wherein the pair of molding die members are configured to be slid or held in the holding member by the static pressure film while the pair of molding die members and the holding member are in a non-contact state.

11. The molding apparatus of claim 10, wherein the clearance between the pair of molding die members and the holding member is within a range of 0.1–100 μm.

12. The molding apparatus of claim 10, wherein the pressure-transfer medium is gas or liquid.

13. The molding apparatus of claim 10, wherein the pressure-transfer medium supplying means supplies the pressure-transfer medium to the clearance under a pressure of 200 kPa–2000 kPa.

14. The molding apparatus of claim 10, wherein the pressure-transfer medium supplying means supplies the pressure-transfer medium to the clearance at temperature of 100–1000° C.

15. The molding apparatus of claim 10, wherein the pressure-transfer medium supplying means supplies the pressure-transfer medium to the clearance at temperature of (T−200° C.) to (T+200° C.), where T represents glass transition point of a material for the molded products.

16. The molding apparatus of claim 10, further comprising a plurality of a pressure adjustment mechanisms for adjusting pressures, wherein the pressure adjustment mechanisms control a distance of the clearance between at least one of the pair of molding die members and the holding member by regulating pressure of the pressure-transfer medium supplied from the plurality of supply ports.

17. The molding apparatus of claim 16, wherein the pressure adjustment mechanisms control a shifted eccentricity of at least one of the pair of molding die members by regulating pressure of the pressure-transfer medium supplied from the plurality of supply ports.

18. The molding apparatus of claim 16, wherein the pressure adjustment mechanisms control a tilted eccentricity of at least one of the pair of molding die members by regulating pressure of the pressure-transfer medium supplied from the plurality of supply ports.

19. The molding apparatus of claim 10, wherein the molded products are optical elements.

20. A molding apparatus comprising:
a molding die comprising
a molding means for forming a molding cavity that molds molded products;
a holding means for holding therein the molding means slidably, an inner surface of the holding means and an outer surface of the molding means being separated by a clearance;
a plurality of supplying means for supplying a pressure-transfer medium located on one of the inner surface of the holding means and the outer surface of the molding means, and
a static pressure film of the pressure-transfer medium, the static pressure film filling the clearance; and
an outer pressure medium transfer means for transferring the pressure-transfer medium to the supply port,
wherein the molding means are configured to be slid or held in the holding means by the static pressure film while the molding means and the holding means are in a non-contact state.

21. The molding apparatus of claim 20, wherein the outer pressure medium transfer means is a compressor.

22. A molding die comprising:
a molding means for forming a molding cavity that molds molded products;
a holding means for holding therein the molding means slidably, an inner surface of the holding means and an outer surface of the molding means being separated by a clearance;
a plurality of supplying means for supplying a pressure-transfer medium located on one of the inner surface of the holding means and the outer surface of the molding means; and
a static pressure film of the pressure-transfer medium, the static pressure film filling the clearance;
wherein the molding means are configured to be slid or held in the holding means by the static pressure film while the molding means and the holding means are in a non-contact state.

23. A molding die comprising:
a molding cavity formed by a pair of molding die members which is held slidably in a holding member, an inner surface of the holding member and an outer surface of the pair of molding die members being separated by a clearance;
a plurality of supply ports that supply a pressure-transfer medium located on one of the inner surface of the holding member and the outer surface of the pair of molding die members; and
a static pressure film of the pressure-transfer medium, the static pressure film filling the clearance;
wherein the pair of molding die members are configured to be slid or held in the holding member by the static pressure film while the pair of molding die members and the holding member are in a non-contact state.

24. A molding apparatus comprising:
a molding die comprising
a molding cavity formed by a pair of molding die members which is held slidably in a holding member, an inner surface of the holding member and an outer surface of the pair of molding die members being separated by a clearance; and
a plurality of supply ports that supply a pressure-transfer medium located on one of the inner surface of the holding member and the outer surface of the pair of molding die members; and
a static pressure film of the pressure-transfer medium, the static pressure film filling the clearance; and
a pressure-transfer medium supplying means for supplying the pressure-transfer medium to the clearance between the molding die member and the holding member,
wherein the pair of molding die members are configured to be slid or held in the holding member by the static pressure film while the pair of molding die members and the holding member are in a non-contact state.

25. A molding die comprising:
a pair of molding die members that forms a molding cavity that molds molded products;
a holding member that holds therein the pair of molding die members slidably, an inner surface of the holding member and an outer surface of the pair of molding die members being separated by a clearance;
a plurality of supply ports that supply a pressure-transfer medium located on one of the inner surface of the holding member and the outer surface of the pair of molding die members, the plurality of supply ports being arranged at equally spaced intervals on the inner surface or the outer surface in a direction perpendicular to an axial direction of the holding member; and
a static pressure film of the pressure-transfer medium, the static pressure film filling the clearance,
wherein the pair of the molding die members are configured to be slid or held in the holding member by the static pressure film while the pair of the molding die members and the holding member are in a non-contact state.

26. The molding die of claim 25, wherein the clearance between the pair of molding die members and the holding member is within a range of 0.1–100 $\mu$m.

27. The molding die of claim 25, wherein the pressure-transfer medium is gas or liquid.

28. The molding die of claim 25, further comprising
a supply path for the pressure-transfer medium connected to the plurality of supply ports; and
a fixed throttle provided on the supply path for regulating a flow of the pressure-transfer medium;
wherein the plurality of supply ports are provided on one of the pair of molding die members for supplying the pressure-transfer medium to the clearance between the pair of molding die members and the holding member.

29. The molding die of claim 25, wherein the plurality of supply ports are provided on one of the pair of molding die members for supplying the pressure-transfer medium to the clearance between the pair of molding die members and the holding member,
wherein a circumference of at least one of the plurality of supply ports is recessed.

30. The molding die of claim 25, further comprising,
a supply path for the pressure-transfer medium connected to the plurality of supply ports; and
an automatic adjusting throttle provided on the supply path;
wherein the plurality of supply ports are provided on the holding members for supplying the pressure-transfer medium to the clearance between the pair of molding die members and the holding member.

31. The molding die of claim 25, wherein at least one of the supply ports is a porous member through which the pressure-transfer medium is supplied to the clearance.

32. The molding die of claim 25, wherein at least one of the pair of molding die members or the holding member is made of ceramic material.

33. The molding die of claim 25, wherein the molded products are optical elements.

34. A molding apparatus comprising:
a molding die comprising
a pair of molding die members that form a molding cavity for molding molded products;
a holding member that holds therein the pair of molding die members slidably, an inner surface of the holding member and an outer surface of the pair of molding die members being separated by a clearance;
a plurality of supply ports that supply a pressure-transfer medium located on one of the inner surface of the holding member and the outer surface of the pair of molding die members, the plurality of supply ports being arranged at equally spaced intervals on the inner surface or the outer surface in a direction perpendicular to an axial direction of the holding member; and
a static pressure film of the pressure-transfer medium, the static pressure film filling the clearance; and
a pressure-transfer medium supplying means for supplying the pressure-transfer medium to the clearance between the molding die members and the holding member;
wherein the pair of molding die members are configured to be slid or held in the holding member by the static pressure film while the pair of molding die members and the holding member are in a non-contact state.

35. The molding apparatus of claim 34, wherein the clearance between the pair molding die members and the holding member is within a range of 0.1–100 $\mu$m.

36. The molding apparatus of claim 34, wherein the pressure-transfer medium is gas or liquid.

37. The molding apparatus of claim 34, wherein the pressure-transfer medium supplying means supplies the pressure-transfer medium to the clearance under a pressure of 200 kPa–2000 kPa.

38. The molding apparatus of claim 34, wherein the pressure-transfer medium supplying means supplies the pressure-transfer medium to the clearance at temperature of 100–1000° C.

39. The molding apparatus of claim 34, wherein the pressure-transfer medium supplying means supplies the pressure-transfer medium to the clearance at temperature of (T−200° C.) to (T+200° C.), where T represents glass transition point of a material for the molded products.

40. The molding apparatus of claim 34, further comprising a plurality of pressure adjustment mechanisms for adjusting pressure, wherein the pressure adjustment mechanisms control a distance of the clearance between at least one of the pair of molding die members and the holding member by regulating pressure of the pressure-transfer medium supplied from the plurality of supply ports.

41. The molding apparatus of claim 34, wherein the pressure adjustment mechanisms control a shifted eccentricity of at least one of the pair of molding die members by regulating pressure of the pressure-transfer medium supplied from the plurality of supply ports.

42. The molding apparatus of claim 34, wherein the pressure adjustment mechanisms control a tilted eccentricity of at least of the pair of molding die members by regulating pressure of the pressure-transfer medium supplied from the plurality of supply ports.

43. The molding apparatus of claim 34, wherein the molded products are optical elements.

44. A molding die comprising:
a pair of molding die members that forms a molding cavity that molds molded products;
a holding member that holds therein the pair of molding die members slidably, an inner surface of the holding member and an outer surface of the pair of molding die members being separated by a clearance;
a plurality of supply ports that supply a pressure-transfer medium located on one of the inner surface of the holding member and the outer surface of the pair of molding die members; and
a static pressure film of the pressure-transfer medium, the static pressure film filling the clearance;
wherein not all of the plurality of supply ports are in a straight line in the axial direction of the pair of molding die members; and
wherein the pair of molding die members are configured to be slid or held in the holding member by the static pressure film while the pair of molding die members and the holding member are in a non-contact state.

45. A molding apparatus comprising:
a molding die comprising
a pair of molding die members that form a molding cavity for molding molded products;
a holding member that holds therein the pair of molding die members slidably, an inner surface of the holding member and an outer surface of the pair of molding die members being separated by a clearance;
a plurality of supply ports that supply a pressure-transfer medium located on one of the inner surface of the holding member and the outer surface of the pair of molding die members; and
a static pressure film of the pressure-transfer medium, the static pressure film filling the clearance; and
a pressure-transfer medium supplying means for supplying the pressure-transfer medium to the clearance between the molding die member and the holding member;
wherein not all of the plurality of supply ports are in a straight line in the axial direction of the pair of molding die members; and
wherein the pair of molding die members are configured to be slid or held in the holding member by the static pressure film while the pair of molding die members and the holding member are in a non-contact state.

* * * * *